UNITED STATES PATENT OFFICE.

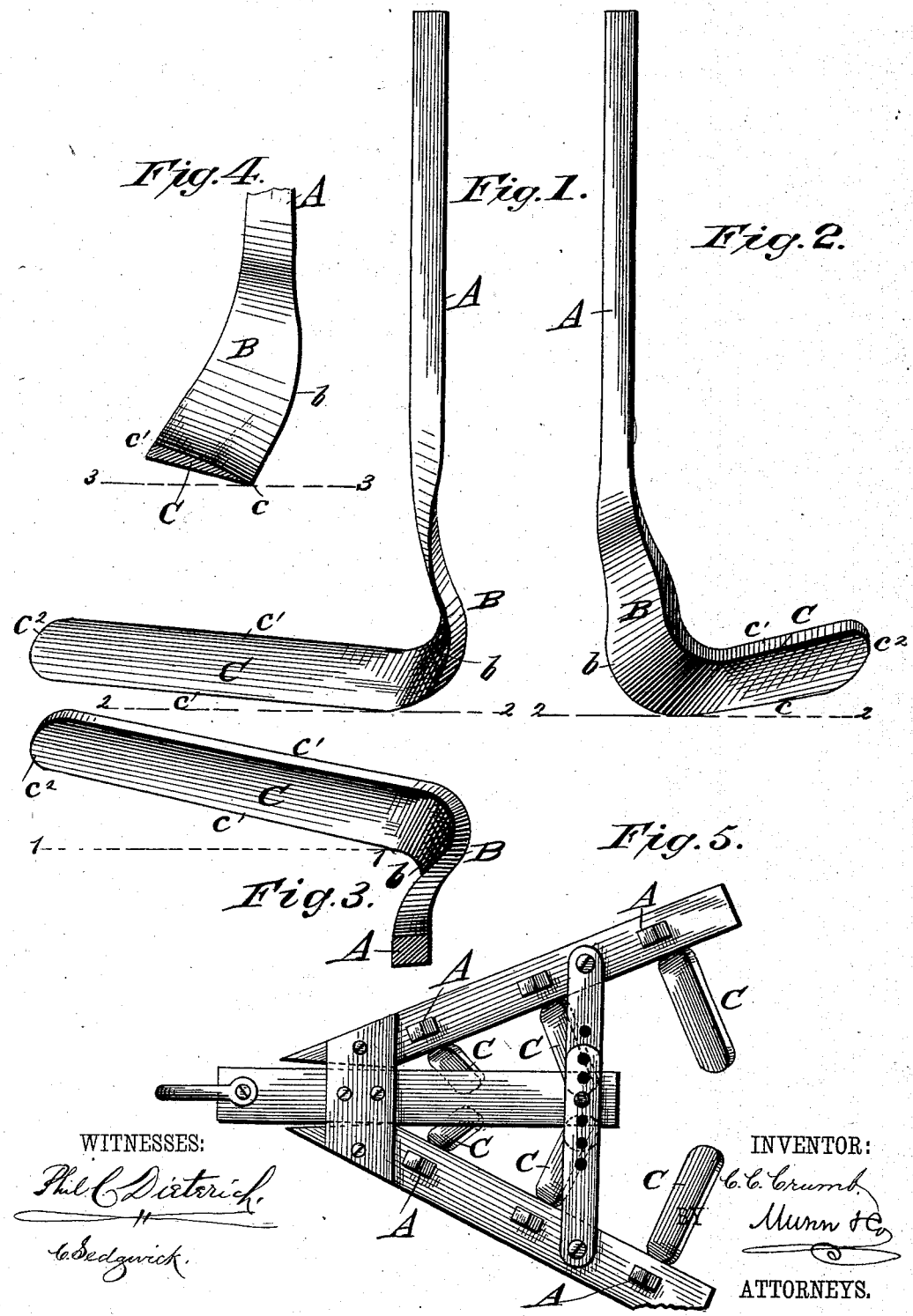

CHARLES CULVER CRUMB, OF BURLINGAME, KANSAS.

CULTIVATING HARROW-TOOTH.

SPECIFICATION forming part of Letters Patent No. 388,536, dated August 28, 1888.

Application filed February 24, 1888. Serial No. 265,173. (No model.)

*To all whom it may concern:*

Be it known that I, CHARLES CULVER CRUMB, of Burlingame, in the county of Osage and State of Kansas, have invented a new and Improved Cultivating Harrow-Tooth, of which the following is a full, clear, and exact description.

My invention relates to cultivator or harrow teeth, and has for its object to provide an inexpensive, durable, and effective tooth of this character, which will work easily and will be practically self cleaning, so that it will promote light draft of the implement and will not clog easily.

The invention consists in certain novel features of construction of the cultivator and harrow tooth, all as hereinafter described and claimed.

Reference is to be had to the accompanying drawings, forming a part of this specification, in which similar letters of reference indicate corresponding parts in all the figures.

Figure 1 is a front view of one of my improved cultivating harrow-teeth. Fig. 2 is an inner view thereof taken about at a right angle to Fig. 1. Fig. 3 is a plan view of the tooth with its shank in horizontal section. Fig. 4 is a detail view at the inner side of the tooth, the laterally-extending lower part of the tooth being in cross-section; and Fig. 5 is a plan view of a small cultivating-harrow provided with right and left hand teeth made in accordance with my invention.

The shank A of the cultivator or harrow tooth is connected by a portion, B, with the laterally-extending lower portion C, of the tooth, which also has a peculiar construction, presently explained. The tooth-shank A is shown about square or rectangular in cross-sectional form; but it may have any preferred shape as the frame into which it may be fixed and any prefered mode of fastening it may suggest or require.

A comparison of Figs. 1, 2, 3, and 4 of the drawings will disclose that the forward edges of the bend and blades B C of the tooth are sharpened at $b$ $c$, respectively, and that the corner B, with its sharp edge $b$, curves or rounds backward from the vertical axis of the tooth-shank A, (see Fig. 4;) and that the entire blade C stands at a backward incline to a dotted line, 1 1, drawn at about right angles to the line of draft of the tooth or cultivator or harrow of which it forms a part; and that the blade C inclines upward from its inner end next the bend B of the tooth to the outer end or extremity of the blade, as will appear at and above the dotted line 2 2 2 in Figs. 1 and 2 of the drawings; and that the blade stands highest at its rear edge, $c'$, which is preferably about parallel with its front sharp edge, $c$, and as appears most clearly in Fig. 4 of the drawings. The backwardly-curved and sharp front edge, $b$, of the tooth-bend B gives easier and cleaner cutting action and better clearance to the tooth than it otherwise would have, so that clogging of the tooth is not liable to occur; and the backward incline of the blade shown in Fig. 3 also facilitates easy cutting and free clearance of the tooth; and the transverse incline of the blade shown in Fig. 4 also assures easy cutting action of the tooth, and is largely instrumental in effecting free clearance of the tooth as it moves forward when at work; and as the inner end of the blade next the bend or angle B cuts deeper than the extremity $c^2$ of the blade this feature also facilitates the easy clearance of the tooth and causes it to work the earth a little deeper and more thoroughly at the sides of the plants under cultivation.

The blades C of the teeth will be made right and left handed, to allow them to be fixed to the opposite side bars of a cultivator or harrow frame, and in a rearwardly diverging or broadening implement the teeth will be made successively larger from the front to rear of the frame, as will be understood from Fig. 5 of the drawings.

The above-described cultivator or harrow teeth may be made larger or smaller and heavier or lighter, as the size or style of the cultivator or harrow may require.

Having thus described my invention, what I claim as new, and desire to secure by Letters Patent, is—

A cultivator or harrow tooth made with a shank, a laterally-extending blade which in direction of its length inclines backward from the axis of the shank, and is sharp at its front edge, and is transversely inclined, so as to be higher at its rear than at it front edge, and said blade connected to the shank by a bend having a vertically and rearwardly curved or inclined sharp front edge, $b$, substantially as described, for the purposes set forth.

CHARLES CULVER CRUMB.

Witnesses:
G. E. EMPIN,
E. S. TAYLOR.